Patented July 30, 1940

2,209,934

UNITED STATES PATENT OFFICE 2,209,934

PROCESS FOR PRODUCING 7-DEHYDRO-STEROID COMPOUNDS

Hans R. Rosenberg, Wilmington, Del., assignor to E. I. du Pont de Nemours & Company, Wilmington, Del., a corporation of Delaware No Drawing. Application September 2, 1938, Serial No. 228,219

24 Claims. (Cl. 260—397)

This invention relates to the production of 7-dehydro-sterol compounds containing in ring II of the sterol ring system two conjugated double bonds.

It is known that certain 7-dehydro-sterol compounds are valuable provitamins. For example, 7-dehydro-cholesterol, 7-dehydro-stigmasterol, 7-dehydro-sitosterol and certain of their derivatives may be antirachitically activated to produce vitamin D.

The aforesaid and related 7-dehydro-sterols may be obtained by chemical synthesis involving the thermal decomposition of an esterified 7-hydroxy-sterol. An illustration of this reaction is the thermal decomposition of 7-hydroxy-cholesterol - dibenzoate, 7-hydroxy-stigmasterol-dibenzoate and 7-hydroxy-sitosterol-dibenzoate, which is described in U. S. Patent No. 2,098,984. The aforesaid reactions are subject to many disadvantages, among which are the difficulty of controlling the reaction, the production of undesirable by-products, the difficulty of treating a large quantity of materials, the relatively few types of esters which are susceptible to it, etc.

It is an object of the present invention to overcome the aforementioned disadvantages of the prior art and many other disadvantages which directly or indirectly result therefrom. A further object is to produce valuable provitamins by an efficient chemical treatment of esterified 7-hydroxy-sterols. A still further object is to produce 7-dehydro-sterols, by a surprisingly satisfactory chemical process. A still further object is to produce 7-dehydro-sterols by the splitting off of an acid and the formation of a new double bond in ring II of the sterol compound from the corresponding esterified 7-hydroxy-sterols. A still further object is to produce almost theoretical yields of valuable provitamins by the chemical dehydrogenation of esterified 7-hydroxy-cholesterol, 7-hydroxy-stigmasterol and 7-hydroxy-sitosterol. Additional objects will become apparent from a consideration of the following specification and claims.

These objects are attained in accordance with the present invention wherein 7-dehydro-sterols are produced by treating esterified 7-hydroxy-sterols with a nitrogen-containing base and saponifying the resulting product. In a more restricted sense these objects are attained by reacting esterified 7-hydroxy-sterols with an organic nitrogen base, and in particular with an organic amine and saponifying the resulting product. In its preferred embodiment this invention is directed to the treatment of 7-hydroxy-cholesterol-dibenzoate, 7-hydroxy-sitosterol-dibenzoate and/or 7-hydroxy-stigmasterol-dibenzoate with an organic amine, preferably an amine such as dimethyl-aniline, diethyl-aniline, or diethyl-amino-cyclohexylamine and saponifying the resulting product.

The invention may be more readily understood by a consideration of the following illustrative examples:

Example I 610 grams of 7-hydroxy-cholesterol-dibenzoate, M. P. 172.5–173.5 are dissolved in 2000 cc. dimethyl-aniline and the mixture is refluxed for two hours. (Temp. 190–195° C.) The dimethyl-aniline solution is poured into water, extracted with ether and the ether solution extracted with hydrochloric acid, sodium carbonate and water. After drying of the ether solution, the ether is distilled off. The residue contains 7-dehydro-cholesteryl-benzoate which is isolated as such or saponified with potassium hydroxide in alcoholic solution. In the usual manner, the saponification product is worked up and the 7-dehydro-cholesterol crystallized from ether-methyl-alcohol. 250 grams of 7-dehydro-cholesterol is obtained, representing a yield of 65%.

Example II

Beta-7-hydroxy-cholesteryl-dibenzoate, M. P. 150–151° (described by T. Barr, I. M. Heilbron, E. G. Parry and F. S. Spring, Journal of Chemical Society, London, 1936, 1437) is refluxed with diethyl-aniline for two hours. After cooling to room temperature, the reaction product is mixed with diluted hydrochloric acid and extracted with ether. After purification of the ether solution with diluted acid and alkali, a 10% solution of potassium hydroxide in alcohol is added and refluxed for one-half hour. The ether is distilled off and the residue poured into water and extracted with ether. The ether solution is dried over sodium sulfate. By the evaporation of the ether in vacuum, 7-dehydro-cholesterol crystallizes out. Yield=60–70%.

Example III 7-hydroxy-stigmasteryl-dibenzoate is refluxed with diethyl-amino-cyclohexylamine for one hour. After working up in the usual manner, 60% of 7-dehydro-stigmasteryl-benzoate, and after saponification, the free 7-dehydro-stigmasterol, is obtained.

Example IV 7-hydroxy-sitosteryl-dibenzoate is heated with dimethyl-stearyl-amine for one hour at about 200° C. The reaction product is worked up in the usual manner. Forty per cent of 7-dehydro-sitosterol is obtained.

Example V 7-hydroxy-cholesteryl-dibenzoate and pyridine are heated in a sealed tube to 200° C. From the reaction product, 7-dehydro-cholesteryl-benzoate, or after saponification, 7-dehydro-cholesterol, is isolated.

Example VI 7-hydroxy-sitosteryl-dibenzoate is refluxed with mono-ethyl-aniline for two hours. After working up in the usual manner, 7-dehydro-sitosteryl-benzoate and after saponification 7-dehydro-sitosterol, is obtained.

Example VII 7-hydroxy-cholesteryl-dibenzoate is dissolved in methyl-undecylamine and heated to 200° C. for one hour. After saponification of the reaction product, 7-dehydro-cholesterol is obtained.

Example VIII 7-dehydro-cholesteryl-dibenzoate is dissolved in aniline and refluxed for one hour. After saponification of the reaction product, about 40% 7-dehydro-cholesterol is obtained.

Example IX 7-hydroxy - cholesteryl - diacetate is refluxed with dimethyl-aniline for 2 hours. The reaction product contains 7-dehydro-cholesteryl-acetate which can be converted into 7-dehydro-cholesterol by saponification.

It is to be understood that the aforesaid examples are illustrative merely and may be varied widely with respect to the individual reactants, the proportions of these reactants, and the conditions of reaction without departing from the scope of this invention.

For example, in place of the 7-hydroxy-sterol di-esters referred to therein, or in addition thereto, other esterified 7-hydroxy-sterol compounds such as the simple or mixed diesters prepared from nitrobenzoic, meta-dinitrobenzoic, chlorobenzoic, toluic, phenyl acetic, cinnamic and aliphatic, e. g. formic, propionic, butyric, valeric, etc. acids, anhydrides, and acid halides, e. g. acyl-chlorides, may be used. Mixed aliphatic, aromatic acid esters, e. g. 7-hydroxy-cholesteryl-3-benzoate-7-acetate have utility. Likewise, mixtures of two or more of the aforesaid 7-hydroxy-sterol simple or mixed esters may be treated at the same time.

It is to be understood, however, that this invention is particularly directed to the treatment of esterified 7-hydroxy-cholesterol, 7-hydroxy-stigmasterol and 7-hydroxy sitosterol. For optimum results over a wide range of conditions, it is to be understood that the preferred embodiment of this invention involves the treatment of the dibenzoates, diacetates or benzoateacetates of the aforesaid 7-hydroxy-sterol compounds.

As previously mentioned, this invention is understood to be of much broader scope than the aforesaid preferred embodiments and may embrace the treatment of sterols generally wherein a double bond exists in a position adjacent to the esterified hydroxy group in 7-position, regardless of whether additional substituents are also present in other positions in the molecule. Any ester compound having the cyclo-pentano-perhydro-phenanthrene skeleton may be used. Such substances are sometimes termed steroid or sterid compounds and include those having the nucleus referred to with or without side chains including said chains with other functional groups such as oxo, hydroxy and carboxyl groups and their derivatives.

A wide variety of nitrogen containing bases may be used in carrying out the present process with satisfactory results. They may be used alone or in admixture with inert organic solvents or diluents. Bases which are of particular value in this connection are the organic mono-, di- and poly-amines of either primary, secondary or tertiary character. Among the representative amines of this type reference may be made to the following:

Aniline
Pyridine
Piperazine
Piperidine
Dimethyl-aniline
Diethyl-aniline
Diethyl-a-naphthylamine
Diethylamino-cyclohexylamine
Dimethyl-stearylamine
Methyl-undecylamine
Mono-ethyl-aniline
Quinoline
Triethylamine The aforesaid and related amines may be used alone or in admixture with one another and in conjunction with inert organic solvents. The amines which have a dissociation constant between $10^{-2}$ and $10^{-14}$ were found to work very favorably in the reaction In treating the esterified 7-hydroxy-sterol with the bases, in accordance with the instructions of the present invention, it is generally advisable to reflux these materials together for a sufficient period of time to permit the desired reaction to take place. This period of time will, of course, vary with the particular sterol compound treated, and the particular base used in this treatment and the temperature of the reaction. As a general rule, for any given mixture of reactants, the higher the temperature, the less time required. For optimum results, it has been found that refluxing these reactants for a period of at least one-half hour and not more than 15 hours is sufficient. In some cases it may be advantageous to work in an autoclave especially when the bases used boil below 200° C. An evacuated system may be resorted to in case the boiling point of the base is too high or the presence of air is not desired.

In general, the time will vary between 2 and 5 hours and the temperature will vary between 150 and 200° C. However, it is to be understood that the aforesaid time intervals may be greater or less than designated, and in the same manner the temperature ranges may be higher or lower than those referred to, for instance, temperatures between 100 and 300° C. have been found to be quite satisfactory.

Where the provitamin obtained in accordance with this invention contains unreacted ester groupings, or some other substituents which are not necessary for antirachitic activation it is contemplated that these substituents may be modified or eliminated completely in accordance with customary chemical technique. For instance, where the resulting products contain an ester grouping, this grouping may be removed by the usual saponification reaction.

In accordance with this invention new provitamins of considerable commercial value may be obtained in a simple and expeditious manner. These provitamins may be obtained by a method which permits the treatment of large volumes of raw material. This method greatly decreases the difficulty of controlling the reaction and appreciably lessens the production of undesirable by-products. Furthermore, this method permits a selective dehydrogenation of the esterified 7-hydroxy-sterols to take place in such manner that the resulting products possess conjugated double bonds. This phenomena has been noticed, and is particularly surprising in view of the fact that other esterified groupings in the molecule are not affected thereby and are present on the resulting products in addition to the conjugated double bonds.

As many apparently widely different embodiments of this invention may be made without departing from the spirit and scope thereof, it is to be understood that I do not limit myself to the specific embodiments thereof except as defined in the appended claims.

I claim:

1. A process which comprises reacting a steroid characterized by having an esterified hydroxyl group in the 7-position and a double bond in the 5,6-position of a cyclopentano-perhydro-phenanthrene nucleus with an organic nitrogen containing base.

2. A process which comprises reacting a steroid characterized by having an esterified hydroxyl group in the 7-position and a double bond in the 5,6-position of a cyclopentano-perhydro-phenanthrene nucleus with an organic nitrogen containing base, and saponifying the resulting product.

3. In a process for producing 7-dehydro-sterols, the step which comprises reacting an esterified 7-hydroxy-sterol compound with a nitrogen containing base.

4. A process for producing 7-dehydro-sterols which comprises reacting an esterified 7-hydroxy-sterol with an organic base, and saponifying the resulting product.

5. In a process for producing 7-dehydro-cholesterol the step which comprises reacting an esterified 7-hydroxy-cholesterol with an organic base.

6. A process for producing a 7-dehydro-cholesterol which comprises refluxing esterified 7-hydroxy-cholesterol with an organic amine, and saponifying the resulting product.

7. In a process for producing 7-dehydro-cholesterol esters, the step which comprises reacting di-esters of 7-hydroxy-cholesterol and monocarboxylic acids, with a tertiary organic amine.

8. In a process for producing 7-dehydro-cholesterol-benzoate, the step which comprises reacting 7-hydroxy-cholesterol dibenzoate with a tertiary organic amine.

9. In a process for producing 7-dehydro-cholesterol, the step which comprises reacting a 7-hydroxy-cholesterol carboxylic acid ester with an organic nitrogen base having a dissociation constant between $10^{-2}$ and $10^{-14}$ at a temperature between 100° and 300° C.

10. A process as set forth in claim 4 wherein said esterified 7-hydroxy-sterol compound is a diester of an aromatic monocarboxylic acid.

11. A process as set forth in claim 4 wherein said esterified 7-hydroxy-sterol compound is a diester of an aliphatic monocarboxylic acid.

12. A process as set forth in claim 4 wherein said esterified 7-hydroxy-sterol compound is a mixed aromatic monocarboxylic-aliphatic monocarboxylic acid ester.

13. A process as set forth in claim 4 wherein said base is an aliphatic amine.

14. A process as set forth in claim 4 wherein said base is dimethylaniline.

15. A process as set forth in claim 4 wherein said base is diethylaminocyclohexylamine.

16. A process as set forth in claim 4 wherein said base is pyridine.

17. In a process for producing 7-dehydro-cholesterol, the step which comprises reacting 7-hydroxy-cholesterol-dibenzoate with an organic nitrogen base having a dissociation constant between $10^{-2}$ and $10^{-14}$.

18. In a process for producing 7-dehydro-cholesterol, the step which comprises reacting 7-hydroxy-cholesterol-diacetate with an organic nitrogen base having a dissociation constant between $10^{-2}$ and $10^{-14}$.

19. A process which comprises reacting a steroid characterized by having esterified hydroxyl groups in the 3- and 7-positions and a double bond in the 5,6-position of a cyclopentano-perhydro-phenanthrene nucleus with an organic nitrogen containing base, and saponifying the resulting product.

20. In a process for producing 7-dehydro sterols, the step which comprises reacting 7-hydroxy-sterol carboxylic acid diesters with an organic amine.

21. In a process for producing 7-dehydro sterols, the step which comprises reacting 7-hydroxy-sterol carboxylic acid diesters with a primary amine.

22. In a process for producing 7-dehydro sterols, the steps which comprise reacting 7-hydroxy-cholesterol carboxylic acid diesters with an organic amine, and saponifying the resulting product.

23. In a process for producing 7-dehydro-cholesterol, the steps which comprise reacting a 7-hydroxy-cholesterol carboxylic acid diester with an organic nitrogen base having a dissociation constant between $10^{-2}$ and $10^{-14}$ at a temperature between 100° and 300° C. and saponifying the resulting product.

24. In a process for producing 7-dehydro-cholesterol, the steps which comprise reacting a 7-hydroxy-cholesterol carboxylic acid diester with an organic nitrogen base having a dissociation constant between $10^{-2}$ and $10^{-14}$ at a temperature between 100° and 300° C. in the presence of an inert organic diluent, and saponifying the resulting product.

HANS R. ROSENBERG.